3,058,929
Patented Oct. 16, 1962

3,058,929
METHOD OF POLYMERIZING A VINYL AROMATIC MONOMER IN THE PRESENCE OF AN ORGANIC BROMIDE AND AN ORGANIC PEROXIDE AND A SELF-EXTINGUISHING VINYL AROMATIC POLYMER CONTAINING SAME
John W. Vanderhoff and Alex K. Jahn, Midland, Mich., assignors to The Dow Chemical Company, Midland, Mich., a corporation of Delaware
No Drawing. Filed Sept. 28, 1959, Ser. No. 842,560
25 Claims. (Cl. 260—2.5)

This invention concerns self-extinguishing thermoplastic vinyl aromatic polymer compositions. It relates to vinyl aromatic polymer compositions suitable for making self-extinguishing cellular masses and pertains to a method of making the polymer compositions and self-extinguishing cellular articles. It relates more particularly to foamable vinyl aromatic polymer compositions containing an organic bromide, together with an organic peroxide, e.g. dicumyl peroxide, and a volatile organic compound as foaming agent and pertains to a method of making the same.

This application is a continuation-in-part of our application Serial No. 750,838, filed July 24, 1958, now abandoned.

It is known to prepare porous or foamed masses of thermoplastic resins, e.g. polystyrene, by polymerizing styrene in the presence of a small amount of an organic liquid such as pentane, hexane, heptane, petroleum ether, etc., which only swells the polymerizate, the polymerization being carried out at a temperature below the boiling point of the liquid, to obtain a solid polymer body containing the volatile liquid dispersed throughout, and thereafter heating the solid mass to a temperature above the boiling point of the liquid and above the softening point of the polystyrene whereby the softened polymer foams to a porous or cellular mass.

It is nown to prepare non-flammable or self-extinguishing cellular bodies of thermoplastic resin compositions by incorporating polyhalogen-containing organic compounds, e.g. organic bromides, in alkenyl aromatic resins such as polystyrene, copolymers of styrene and alpha-methyl styrene or copolymers of styrene and methylmethacrylate or acrylonitrile, and dissolving a normally gaseous agent such as methyl chloride, methyl ether, etc., in the resin under pressure to form a mobile, or flowable gel and thereafter releasing the pressure as by extrusion of the gel from the vessel in which it was formed into the atmosphere.

It has now been found that self-extinguishing vinyl aromatic polymer compositions, and particularly latent-foaming vinyl aromatic polymer compositions suitable for making self-extinguishing or non-flammable cellular bodies, can readily be prepared by polymerizing monomeric alkenyl aromatic compounds in admixture with certain organic polyhalogen-containing compounds, e.g. organic bromo-compounds, and one or more organic peroxides, and with or without a volatile organic compound which is a non-solvent for the polymerizate as foaming agent, the latter being employed when latent-foaming polymer compositions are desired.

It has further been found that polymerizing the monomeric alkenyl aromatic compound in admixture with the polyhalogen-containing organic compound and the organic peroxide results in the formation of resinous products which are surprisingly non-flammable or self-extinguishing. By polymerizing the alkenyl aromatic compound in the presence of the organic polyhalogen-containing compound and the organic peroxide so as to obtain a final product comprising a solid dense polymer, e.g. a glass-clear or opaque solid polymer having a density between about 0.9 and 1.2, and containing at least a portion of the organic polyhalogen-containing compound chemically combined in the polymer molecule, together with the organic peroxide, and with or without a volatile organic compound uniformly dispersed throughout, it has been found that such normally solid polymer, or solid latent-foaming polymer compositions, containing extremely small proportions of the polyhalogen-containing organic compound, e.g. from 0.2 to 3 percent by weight, based on the weight of the polymer, are self-extinguishing or when foamed to form cellular articles are non-flammable or self-extinguishing.

The expressions "non-flammable" and "self-extinguishing" as employed herein, mean incapable of burning or sustaining a flame for more than 20 seconds after a composition has been heated in an open flame and ignited and then removed from the flame.

In accordance with the present invention, improved flame retardant and/or self-extinguishing polymers, and particularly alkenyl aromatic polymers, are provided which contain organic bromides as flame-proofing agents in combination with an organic peroxide as a synergist, whereby the bromine-containing flame-proofing agent need be present in an amount which is substantially smaller than that normally required for flame-proofing the same polymer—by the same flame-proofing agent—to the same degree. The organic peroxide must be present in an amount which will produce a pronounced synergistic effect. Superior flame retardance and/or self-extinguishing properties are generally assured if the organic peroxide is one which is relatively insensitive to the effects of elevated temperatures, being also realtively stable against decomposition by such chemicals as acids, bases, or catalysts promoting the decomposition of peroxides per se. The said chemicals or agents may be present in the polymer composition, or more often may be formed therein by partial decomposition of the polymer or of other components contained therein, e.g. plasticizer or halogenated flame-proofing agents.

Processing and shaping of thermoplastic polymers usually requires the application of elevated temperatures, with the accompanied risk of destroying the peroxides contained therein. In accordance with the invention, therefore, such peroxides are preferred which are relatively heat stable as expressed, e.g. by a half-life of at least 2 hours at 100° C., and for extreme heat stability a half-life of at least 5 to 15 hours at the same temperature.

The organic peroxides to be employed in the invention are included in the group of peroxides which comprises the relatively non-volatile solid and liquid organic peroxy compounds having a half-life of at least 2 hours at 100° C. and boiling, if liquid, at 100° C. or above at 760 millimeters absolute pressure. Among suitable peroxy compounds which are operable in the invention are the peroxy esters, the hydroperoxides and the symmetrical and unsymmetrical dialkyl-, diaralkyl and alkylaralkyl peroxides. Such peroxy compounds include methyl ethyl ketone peroxide, pinane hydroperoxide, p-menthane hydroperoxide, 2,5-dimethylhexane-2,5-dihydroperoxide and peroxy compounds having the general formula:

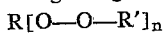

wherein R represents a member of the group consisting of (a) monovalent radicals of the class consisting of the acetyl radical, the benzoyl radical, alkyl radicals containing from 2 to 9 carbon atoms and aralkyl radicals of the formula:

wherein $R_1$ represents an aryl hydrocarbon radical of the benzene series and $R_2$ and $R_3$ each represents a member of the group consisting of hydrogen and alkyl radicals containing from 1 to 3 carbon atoms, and (b) divalent radicals of the formula:

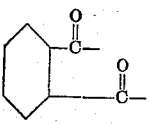

and

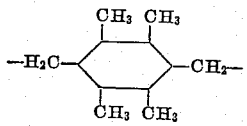

R' represents a member of the group consisting of hydrogen, alkyl radicals containing from 2 to 9 carbon atoms and aralkyl radicals of the formula:

wherein $R_1$, $R_2$ and $R_3$ have the meaning given above, and $n$ is a whole number from 1 to 2, the value of $n$ being 1 when R is a monovalent radical and $n$ being 2 when R is a divalent radical.

Examples of peroxy compounds falling under the above stated general formula are such compounds as tert.-butyl peracetate, tert.-butyl perbenzoate, di-tert.-butyl diperphthalate, cumene hydroperoxide, tert.-butyl hydroperoxide and di(alkyl)-, di(aralkyl)- and alkyl aralkyl peroxides having the formula:

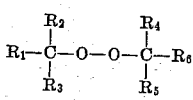

wherein $R_1$ and $R_6$ may be a methyl, ethyl, or aryl hydrocarbon radical of the benzene series, $R_2$ and $R_3$ may be an alkyl radical containing from 1 to 3 carbon atoms or an aryl hydrocarbon radical of the benzene series, and $R_4$ and $R_5$ may be hydrogen, an alkyl radical containing from 1 to 3 carbon atoms, or an aryl hydrocarbon radical of the benzene series. The di(alkyl)-, di(aralkyl)-, and alkyl aralkyl peroxides are preferred. Examples of such peroxides are cumyl ethyl peroxide,
ditert.-butyl peroxide,
di-tert.-amyl peroxide,
cumyl tert.-butyl peroxide,
cumyl tert.-octyl peroxide,
cumyl isopropyl peroxide,
cumyl butyl peroxide,
dicumyl peroxide,
bis(alpha-methylbenzyl)peroxide,
bis(alpha-ethylbenzyl)peroxide,
bis(alpha-propylbenzyl)-peroxide,
bis(alpha-isopropylbenzyl)peroxide,
bis(alpha,alpha-dimethylbenzyl)peroxide,
bis(alpha,methyl-alpha-ethylbenzyl)peroxide,
bis(alpha,alpha-diethylbenzyl)peroxide,
bis(alpha,alpha-di-propylbenzyl)peroxide,
bis(alpha,alpha-diisopropylbenzyl)peroxide,
bis(alpha,alpha-p-methylbenzyl)peroxide,
bis(alpha-methyl-alpha-ethyl-p-methylbenzyl)peroxide,
bis(alpha,alpha-diethyl-p-methylbenzyl)peroxide,
bis(alpha,alpha-diisopropyl-p-methylbenzyl)peroxide,
bis(alpha,alpha-dimethyl-p-ethylbenzyl)peroxide,
bis(alpha-methyl-alpha-ethyl-p-ethylbenzyl)peroxide,
bis(alpha,alpha-diethyl-p-ethylbenzyl)peroxide,
bis(alpha,alpha-diisopropyl-p-ethylbenzyl)peroxide,
bis(alpha,alpha-dimethyl-p-isopropylbenzyl)peroxide,
bis(alpha-methyl-alpha-ethyl-p-isopropylbenzyl)peroxide,
bis(alpha,alpha-diethyl-p-isopropylbenzyl)peroxide,
bis(alpha,alpha-diisopropyl-p-isopropylbenzyl)peroxide,
bis(alpha,alpha-dimethyl-p-tert.-butylbenzyl)peroxide,
bis(alpha-methyl-alpha-ethyl-p-tert.-butylbenzyl)peroxide,
bis(alpha,alpha-diethyl-p-tert.-butylbenzyl)peroxide,
bis(alpha,alpha-diisopropyl-p-tert.-butylbenzyl)peroxide,
bis(alpha,alpha-dimethyl-p-pentamethylethylbenzyl)peroxide,
bis(alpha-methyl-alpha-ethyl-p-pentamethylethylbenzyl)peroxide,
bis(alpha,alpha-diethyl-p-pentamethylethylbenzyl)peroxide,
bis(alpha,alpha-diethyl-p-pentamethylbenzyl)peroxide,
bis(alpha,alpha-diisopropyl-p-pentamethylethylbenzyl)peroxide,
and bis(triphenylbenzyl)peroxide.

The organic peroxide is to be used in such amounts that it is present in the final structure in a concentration which will readily provide the synergistic effect. Accordingly, larger amounts of the peroxide should be applied if the peroxide is one which is not too stable under the conditions of the treatments which the polymer composition will undergo before it is in its finished state. The more stable peroxides, such as dicumyl peroxide, can be applied in considerably smaller amounts. Oftentimes, one tenth of a percent or less or a few tenths of a percent will be sufficient to produce the synergistic effect of the invention. Generally, no more than about 2 percent, based on the weight of the polymer, of the more stable peroxides, i.e. those which have a half-life of more than 2 hours at 100° C. and which are relatively stable against decomposition by acids, bases, or other decomposition catalysts, are required for rendering the resin self-extinguishing.

The vinyl aromatic compound to be employed in making the latent-foaming polymer compositions can be a liquid monomer, a mixture of monomers, or a solution of polymer in monomer, consisting of at least 70 percent by weight of a monovinyl aromatic hydrocarbon or a nuclear halogenated monovinyl aromatic hydrocarbon of the benzene series, or a mixture of from 99.5 to 99.99 percent by weight of a monovinyl aromatic hydrocarbon or a nuclear halogenated monovinyl aromatic hydrocarbon of the benzene series, and from 0.5 to 0.01 percent of a divinyl aromatic hydrocarbon of the benzene series, in which mixture the vinyl aromatic compounds constitute at least 70 percent by weight of the total monomers, the balance being not more than 30 percent by weight of one or more other monoethylenically unsaturated vinyl or vinylidene compounds such as acrylonitrile, methyl methacrylate, alpha-methyl styrene or para-methyl-alpha-methyl styrene. Examples of suitable monovinyl aromatic compounds are styrene, vinyltoluene, vinylxylene, isopropyl styrene, tert.-butyl styrene, chlorostyrene, dichlorostyrene, bromostyrene, ar-ethylvinyl-benzene, or fluorostyrene. The latent-foaming polymer compositions are preferably prepared from monovinyl aromatic hydrocarbons of the benzene series or mixtures of such monovinyl aromatic hydrocarbons and from 0.01 to 0.5 percent by weight of divinylbenzene, based on the sum of the weights of the monomers.

The polyhalogen-containing organic compound to be employed as the self-extinguishing agent, together with the organic peroxide, can be an organic bromide containing a plurality of bromine atoms in an aliphatic or a cycloaliphatic radical, these bromine atoms constituting at least 45 percent by weight of the organic bromide, and which organic bromide preferably has an action of being chemically combined with the polymer. Examples of suitable organic bromides are methyl alpha, beta-dibromopropionate, tris-(dibromopropyl)phosphate, carbon tetrabromide, tetrabromoethylene, 1,2-dibromo-1,1,2,2-tetrachloroethane, 1,1,2,2-tetrabromoethane, dibromodichloromethane, 1,2-dibromo-1,1-dichloroethane, 1,2-dibromo-1,2,2-trichloroethane, 1,2,3,4-tetrabromobutane, 1,2,3-tribromopropane, pentabromoethane, hexabromocyclohexane, tribromotrichlorocyclohexane, 1,2,4-tribromobutane, tetrabromopentane, hexabromoethane, tetrabromodichlorocyclohexane, pentabromomonochlorocyclohexane, 1,2-di-(dibromomethyl)benzene and alpha,beta-dibromoethylbenzene.

The bromochlorocyclohexane compounds can be prepared by reaction of chlorine and bromine with benzene under the influence of actinic radiation, e.g. ultraviolet light or sunlight, employing procedure similar to that described in Bull. soc. chim. (France), pages 118–121 (1949).

The organic bromide can be employed in amounts corresponding to from 0.2 to 3 percent by weight of the monomers or mixture of monomers and polymer initially used, and is preferably used in a proportion less than is required alone to render the polymer non-flammable, and together with the organic peroxide in amounts corresponding to from 0.1 to 2, preferably from 0.2 to 1 percent by weight of the monomers or mixture of monomers and polymer initially used.

The minimum proportions of the organic bromide and the organic peroxide to be employed are dependent to a great extent upon the nature of the polymer and the organic bromide used, since the polymers vary considerably in their burning characteristics and the organic bromides differ among themselves as regards the flame-retarding action of the bromine contained therein, as is well-known. However, self-extinguishing alkenyl aromatic polymer compositions can be obtained employing both the organic bromides and the organic peroxides, and particularly dicumyl peroxide, in proportions within the ranges herein stated.

In accordance with the present invention, certain precautions should be observed in the preparation of the flame retardant and/or self-extinguishing polymers, and/or articles therefrom. Many organic peroxides, are subject to rapid decomposition upon exposure to elevated temperatures and/or to the action of certain chemicals and catalysts which often are present in the polymer compositions, or which alternatively are formed, e.g. by decomposition of the polymeric material or of the halogen containing flame-proofing agents. Some of the well-known flame-proofing agents have a tendency of splitting out hydrogen halides which, due to the acid reaction, deteriorate and decompose the unstable organic peroxides. Even traces of iron and other metals may have the undesirable effect of catalyzing the rapid decomposition of the unstable peroxides.

Accordingly, in order to produce a permanently flame-retardant or self-extinguishing effect in the polymer, it is desirable to use only such peroxides which are relatively stable and not affected, or only moderately affected, by high temperatures and/or by decomposition catalysts.

A suitable indication of the heat stability of a peroxide can conveniently be obtained by subjecting solutions of the peroxide in a suitable organic solvent, preferably benzene, to elevated temperatures for various lengths of time and measuring the amount of peroxide left in the solution. This method has been described by O. L. Mageli, The Society Of The Plastics Industry, Inc. (preliminary copy of a report to be presented at the 13th annual meeting of the Reinforced Plastics Division). It has been found that organic peroxides which have a half-life of 2 hours or more can generally be applied with advantage in the present invention even if the polymer composition containing the peroxide is to be subjected to moderately elevated temperatures. Contemplated exposure to extremely high temperatures makes it desirable to select peroxides which have a longer half-life at 100° C. of, for instance, 5 hours, up to 15 hours, or more. Independently thereof, the possible catalytic effect of acids, bases, or metal ions, etc., which may be expected to be present or formed in the polymer compositions, must be considered in the half-life evaluation. The peroxide, which in itself may have a satisfactory half-life in a pure organic solvent, may not be suitable in a certain polymer composition because of its lacking stability against decomposition catalysts present therein.

The foregoing discussion shows that it is not necessarily sufficient to incorporate into a polymer a suitable amount of a given peroxide, in order to obtain the benefits of the present invention. Evidently, it is necessary that the required amount of peroxide is present in combination with the bromine-containing flame-proofing agent at the time when the polymer is subjected to the effect of heat, causing it to burn. For this reason, many peroxide polymerization catalyst, e.g. benzoyl peroxide, which are generally used in the preparation of the polymers will not produce the favorable results of the present invention. This is due to the fact that nearly all commonly used polymerization catalysts are relatively unstable and thus have been completely, or nearly completely, destroyed during the steps leading to the finished polymers. Thus the incorporation of a flame-proofing agent in such polymers will not produce the results of the present invention.

The self-extinguishing polymer compositions can be prepared by polymerizing the monomer in admixture with the organic bromide and the organic peroxide, in the desired proportions in usual ways, e.g. in mass, in an aqueous emulsion or in suspension in an inert liquid medium.

A convenient mode of preparing the compositions of the present invention comprises a process of polymerizing a mixture containing the monomer, the organic bromide flame-proofing agent, and a relatively stable organic peroxide as synergist. This method is particularly adapted to the direct preparation of self-extinguishing vinyl aromatic polymers. If desired, the polymerization mixture may also contain preformed polymer, which should be applied in an amount which is smaller than that of the monomer. The preformed polymer may be derived from a monomer or monomer mixture which is the same, or if desired, different from that of the monomer or monomer mixture contained in the polymerization mixture. Cross-linking agents, preferably divinyl aromatic compounds such as divinylbenzene, usually in small amounts up to 0.5 percent by weight, may be applied.

It is important that the polymerization be carried out under conditions which do not result in the destroying of the dicumyl peroxide, or of peroxygen groups formed in the polymer during the polymerization, in order that the final product or polymer composition contain the organic peroxide or peroxygen groups in proportions substantially within the range of the proportion initially used. The organic peroxide must be present in an amount which will produce a pronounced synergistic effect.

The polymerization can be carried out at temperatures between 65° and 130° C. without destroying any appreciable amount of the organic peroxide or peroxygen groups formed in the polymer during the polymerization.

In preparing latent-foaming vinyl aromatic polymer compositions capable of being foamed to form a cellular body, the volatile organic compounds to be employed as foaming agents in the polymer compositions can be an organic compound such as a saturated aliphatic hydrocarbon containing from 4 to 7 carbon atoms in the molecule or a perchlorofluorocarbon, which volatile organic compound preferably has a molecular weight of at least 58 and a boiling point not higher than 95° C. at 760 millimeters absolute pressure and which is a non-solvent for the polymer. Examples of suitable organic compounds are n-pentane, isopentane, neopentane, n-butane, isobutane, hexane, heptane or petroleum ether or perchlorofluorocarbons having the structural formulae:

$$CCl_3F$$
$$CCl_2F_2$$
$$CClF_3$$
$$CCl_2F\text{---}CCl_2F$$
$$CClF_2\text{---}CCl_2F$$
$$CClF_2\text{---}CClF_2$$
$$CF_3\text{---}CClF_2$$

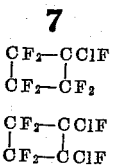

$$\begin{array}{c} CF_2-CClF \\ | \quad | \\ CF_2-CF_2 \end{array}$$

$$\begin{array}{c} CF_2-CClF \\ | \quad | \\ CF_2-CClF \end{array}$$

Mixtures of any two or more of such agents or compounds can also be used. The foaming agent can be employed in amounts corresponding to from 0.05 to 0.4 gram molecular proportion of the volatile organic compound(s) per 100 grams of the alkenyl aromatic compound(s) to be polymerized. The proportion of the foaming agent is preferably calculated on a molar basis per 100 parts by weight of the monomer employed as starting material in order to have present in the polymer composition an amount of said agent sufficient to provide an equal or substantially equal volume of vapors for subsequently expanding the polymer to form a cellular mass, regardless of the density of the volatile organic compound employed.

The latent-foaming polymer compositions can be prepared by polymerizing the monomer starting materials in admixture with the organic bromide, the organic peroxide and the volatile foaming agent in mass, i.e. in the absence or substantial absence of inert diluents or solvents for the polymer, but the polymerization is preferably and advantageously carried out while having the monomer and added ingredients suspended in an inert aqueous medium such as water or brine. The suspension polymerization of the monomers in admixture with the organic bromide and the organic peroxide permits ready control of the reaction to obtain the product in the form of discrete particles or beads and of a desired size.

The polymerization is advantageously carried out in the presence of a per-oxygen catalyst such as benzoyl peroxide, acetyl peroxide, hydrogen peroxide or the like.

The latent-foaming polymer compositions of the invention can be foamed to form cellular articles composed for the most part of individually-closed thin-walled cells which foams are non-flammable, i.e. are self-extinguishing, and are useful for a variety of purposes. They can be foamed in a mold to form boards, rods, plank or other articles having a pre-determined shape. The foamed product is useful as insulating material, as floats for life jackets or rafts or boats or in the manufacture of ornaments, toys or designs.

The following examples illustrate ways in which the principle of the invention has been applied, but are not to be construed as limiting its scope.

EXAMPLE 1

A latent-foaming vinyl aromatic polymer composition was prepared by polymerizing a mixture of styrene and divinylbenzene in admixture with added ingredients of a kind and in amounts as follows:

| Ingredients: | Parts by weight |
|---|---|
| Styrene | 100 |
| Divinylbenzene | 0.08 |
| 1,2-dibromo-1,1,2,2-tetrachloroethane | 0.5 |
| n-Pentane | 7.1 |
| Benzoyl peroxide | 0.43 |
| Dicumyl peroxide | 0.20 |

The ingredients were placed in a closed pressure resistant vessel, together with 125 parts by weight of water containing 0.063 part of potassium dichromate, 0.188 part of a mixture of 23 percent by weight of polyvinyltoluene sulfonic acid sodium salt and 77 percent of sodium sulfate as suspending agent and sufficient sodium hydroxide to bring the aqueous solution to a pH of 6. The resulting mixture was agitated and heated at a temperature of 90° C. for a period of 4 hours. A charge of 0.05 part of sodium lauryl sulfate dissolved in about 10 parts of water was added. Heating of the mixture was continued at 90° C. for 7 hours longer. Thereafter, the mixture was heated at a temperature of 103° C. for a period of 5 hours to complete the polymerization. The product was recovered by cooling the mixture to room temperature in the vessel in which it was prepared, then removing the mixture and separating the polymeric product by filtering it from the aqueous liquid. The product was washed with water and dried. The product was obtained in the form of rounded beads of about 1 mm., diameter. The product was a latent-foaming polymer composition.

A portion of the product was placed in an open chamber and heated with steam at a temperature of 195° F. The beads were pre-foamed to a bulk density of 2 lbs/cu.ft. A portion of the pre-foamed beads was placed in a perforated mold and were foamed to form a cellular board of 1 x 10 inches cross section by 16 inches long. Test pieces, free of outer or continuous surface, of ¼ x 1 cross section by 6 inches long were cut from the foamed board. These test pieces were used to determine the burning or self-extinguishing property of the foam. The procedure for carrying out the test was to hold a test piece of the foam by one end in a fixed horizontal position with the one inch side perpendicular, then move a microburner with a one inch flame under the test piece so that the tip of the flame contacts the lower edge of the test piece and ignites the same. The flame is then removed and the test piece observed for burning. The foam prepared from the composition was self-extinguishing in 2 seconds.

For purpose of comparison a polymer composition was prepared by similar procedure, but without the addition of dicumyl peroxide to the monomer starting materials. The polymer beads thus obtained were foamed and the cellular product tested employing procedures as described above. The cellular product burned.

Self-extinguishing foam was obtained when 0.2, 0.3 and 0.4 part of 1,2-dibromo-1,1,2,2-tetrachloroethane was used, together with 0.2 part of dicumyl peroxide, in making polymer compositions, foaming and testing the same as described above. In contrast, the foam prepared from a composition containing 0.1 part of the 1,2-dibromo-1,1,2,2-tetrachloroethane, together with 0.2 part of dicumyl peroxide, was not self-extinguishing. It burned.

EXAMPLE 2

In each of a series of experiments, a latent-foaming polymer composition was prepared by polymerizing a mixture of styrene and divinylbenzene in admixture with 1,1,2,2-tetrabromoethane as the self-extinguishing agent, together with 0.20 percent by weight of dicumyl peroxide based on the weight of the styrene, and n-pentane as the foaming agent employing the ingredients in amounts as follows:

| Ingredients: | Parts by weight |
|---|---|
| Styrene | 100 |
| Divinylbenzene | 0.04 |
| 1,1,2,2-tetrabromoethane | Variable |
| n-Pentane | 7.1 |
| Benzoyl peroxide | 0.43 |
| Dicumyl peroxide | 0.20 |

The polymerization was carried out in aqueous suspension employing procedure similar to that employed in Example 1. The polymer product was foamed and pieces of the foam tested for its flammability characteristics employing procedures similar to those described in Example 1.

Table I identifies the polymer compositions and gives the percent of 1,1,2,2-tetrabromoethane and dicumyl peroxide employed in preparing the same. The table also gives a burning characteristic determined for the foam prepared from the composition. For purpose of comparison, compositions outside the scope of the invention were prepared and tested and the results are reported in the table.

Table I

| Run No. | Polymer Composition | | Foamed Product |
|---|---|---|---|
| | 1,1,2,2-tetra-bromoethane, Percent | Dicumyl Peroxide, Percent | Remarks |
| 1 | 0.1 | 0.2 | Burns. |
| 2 | 0.2 | 0.2 | Self-Extinguishing. |
| 3 | 0.3 | 0.2 | Do. |
| 4 | 0.4 | 0.2 | Do. |
| 5 | 0.5 | 0.2 | Do. |
| 6 | 0.6 | 0.2 | Do. |
| 7 | 0.7 | 0.2 | Do. |
| 8 | 0.9 | 0.2 | Do. |
| 9 | 1 | 0.2 | Do. |
| 10 | 1 | none | Burns. |

EXAMPLE 3

In each of a series of experiments, a charge of 100 parts by weight of styrene and 0.04 part of divinylbenzene was polymerized in admixture with 7.1 parts of n-pentane, 0.5 part of a polyhalogen-containing cyclohexane as identified in the following table, 0.43 part of benzoyl peroxide and 0.2 part of dicumyl peroxide, in an aqueous suspension, employing procedure similar to that employed in Example 1. The polymer composition was foamed and tested employing procedures employed in Example 1. Table II identifies the composition, names the polyhalocyclohexane used and gives the amount of the same and the dicumyl peroxide in the composition.

Table II

| Run No. | Polymer Composition | | | Foamed Product |
|---|---|---|---|---|
| | Polyhalocyclohexane | | Dicumyl Peroxide, Percent | Remarks |
| | Kind | Percent | | |
| 1 | Hexabromocyclohexane | 0.5 | 0.2 | Self-Extinguishing. |
| 2 | Tribromotrichlorocyclohexane. | 0.5 | 0.2 | Do. |
| 3 | Pentabromomonochlorocyclohexane. | 0.5 | 0.2 | Do. |

In contrast, similar compositions prepared without dicumyl peroxide were found to form foamed masses that were not self-extinguishing.

The tribromotrichlorocyclohexane and pentabromomonochlorocyclohexane employed in the experiments were prepared by reacting benzene with a mixture of chlorine and bromine at room temperature under the influence of ultra-violet light. The tribromotrichlorocyclohexane was a crystalline solid melting at temperatures between 137° and 160° C. and contained bromine and chlorine corresponding to the empirical formula $C_6H_6Cl_3Br_3$. The pentabromomonochlorocyclohexane was a crystalline solid melting at 200°–201° C.

EXAMPLE 4

A charge of 100 parts by weight of styrene and 0.08 part of divinylbenzene was polymerized in admixture with 1 part of pentabromoethane, 7.1 parts of n-pentane, 0.23 part of benzoyl peroxide and 0.20 part of dicumyl peroxide in an aqueous suspension employing procedure similar to that employed in Example 1. The product was foamed to form a cellular mass. The foam was self-extinguishing. In contrast, a polymer composition prepared without dicumyl peroxide was flammable, i.e. it burned when foamed and tested.

EXAMPLE 5

In each of a series of experiments, a latent-foaming vinyl aromatic polymer composition was prepared by polymerizing a mixture of styrene and divinylbenzene in admixture with added ingredients of a kind and in amounts as follows:

Ingredients: Parts by weight
- Styrene --- 100
- Divinylbenzene --- 0.08
- 1,1,2,2-tetrabromoethane --- 0.5
- n-Pentane --- 7.1
- Benzoyl peroxide --- 0.43
- Dicumyl peroxide --- Variable The ingredients were placed in a closed pressure resistant vessel, together with 125 parts by weight of water containing 0.063 part of potassium dichromate, 0.188 part of a mixture of 23 percent by weight of polyvinyltoluene sulfonic acid sodium salt and 77 percent of sodium sulfate as suspending agent and sufficient sodium hydroxide to bring the aqueous solution to a pH of 6. The mixture was agitated and heated at a temperature of 90° C. for 11 hours, then was heated at 103° C. for 5 hours. Thereafter, the mixture was cooled to room temperature while stirring in the vessel in which it was prepared, then removed from the vessel. The product was in the form of solid beads of about 1 mm. diameter. Portions of the product were foamed to form a cellular body. Test pieces of the foam were used to determine the self-extinguishing characteristics of the foam employing procedure similar to that employed in Example 1. Table III identifies the experiments and gives the percent by weight of 1,1,2,2-tetrabromoethane and dicumyl peroxide employed in preparing the product. The table also gives a burning characteristic for the foamed product.

Table III

| Run No. | Polymer Composition | | Foamed Product |
|---|---|---|---|
| | 1,1,2,2-Tetrabromoethane, percent | Dicumyl Peroxide, percent | Time to be Self-Extinguished, sec. |
| 1 | 0.5 | 0 | Burns |
| 2 | 0.5 | 0.05 | Burns |
| 3 | 0.5 | 0.1 | 15 |
| 4 | 0.5 | 0.2 | 6 |
| 5 | 0.5 | 0.3 | 2 |
| 6 | 0.5 | 1 | 2 |
| 7 | 0.5 | 2 | 2 |
| 8 | 0.5 | 4 | Burns |

EXAMPLE 6

In each of a series of experiments, a latent foaming polymer composition was prepared employing procedures similar to those employed in Example 5, and using 0.9 part by weight of 1,1,2,2-tetrabromoethane. Table IV identifies the experiments and gives a burning characteristic for the foamed product.

Table IV

| Run No | Polymer Composition | | Foamed Product |
|---|---|---|---|
| | 1,1,2,2-Tetrabromoethane, percent | Dicumyl Peroxide, percent | Time to be Self-Extinguished, sec. |
| 1 | 0.9 | 0 | Burns |
| 2 | 0.9 | 0.05 | Burns |
| 3 | 0.9 | 0.1 | 8 |
| 4 | 0.9 | 0.2 | 2 |
| 5 | 0.9 | 0.3 | 9 |
| 6 | 0.9 | 1.0 | 2 |

EXAMPLE 7

In each of a series of experiments a latent-foaming polymer composition was prepared by polymerizing styrene in admixture with 1,2-dibromo-1,1,2,2-tetrachloroethane as the self-extinguishing agent in proportions as hereinafter stated, together with 0.2 percent by weight of benzoyl peroxide, 0.2 percent by weight of dicumyl peroxide and n-pentane as the foaming agent, employing the ingredients in amounts as follows:

Ingredients: Parts by weight
- Styrene — 100
- 1,2-dibromo-1,1,2,2-tetrachloro-ethane — Variable
- n-Pentane — 7.1
- Benzoyl peroxide — 0.2
- Dicumyl peroxide — 0.2

The polymerization was carried out in an aqueous dispersion of 125 parts of water containing 0.063 part of potassium dichromate and 0.188 part of a mixture of 23 percent by weight of polyvinyltoluene sulfonate and 77 percent of sodium sulfate, and having a pH value of 6. The mixture was stirred and maintained under pressure at a temperature of 65° C. for 64 hours, then was heated at 80° C. for 5 hours to complete the polymerization. Thereafter, the mixture was cooled to room temperature. The product was separated. It was in the form of solid particles, i.e. rounded beads of about 1 mm. diameter. The product was a latent-foaming polymer composition. A portion of the product was foamed and tested for self-extinguishing characteristics employing procedure similar to that employed in Example 1. Compositions were prepared containing 0.5, 0.8 and 1.0 percent by weight, respectively, of the 1,2-dibromo-1,1,2,2-tetrachloroethane. All of the compositions foamed to form a cellular product composed of uniform fine cells having a density of 2 lbs./cu. ft., and all of the foamed products were self-extinguishing.

Similar results were obtained when a composition was prepared and tested as described above using 0.5 percent by weight of 1,1,2,2-tetrabromoethane instead of the 1,2-dibromo-1,1,2,2-tetrachloroethane employed in the experiments.

EXAMPLE 8

A charge of 100 parts by weight of styrene and 0.04 part of divinylbenzene was polymerized in admixture with 1.5 parts of tris-(dibromopropyl)phosphate, 0.43 part of benzoyl peroxide, 0.2 part of dicumyl peroxide and 7.1 parts of n-pentane in an aqueous suspension employing procedure similar to that employed in Example 1. The product was foamed to a cellular mass. The foam was self-extinguishing in one second.

A similar composition prepared and foamed as described above, except employing only 0.5 part of tris-(dibromopropyl)phosphate was self-extinguishing in 14 seconds.

EXAMPLE 9

A charge of 100 parts by weight of styrene and 0.04 part of divinylbenzene was polymerized in admixture with 1.5 parts of 1,2,3,4-tetrabromobutane, 7.1 parts of normal pentane, 0.43 part of benzoyl peroxide and 0.2 part of dicumyl peroxide employing procedure similar to that employed in Example 1. The product was foamed to a cellular mass. It was self-extinguishing in 2 seconds.

A similar composition prepared without the dicumyl peroxide burned until it was consumed.

EXAMPLE 10

A charge of 100 parts by weight of styrene and 0.1 part of divinylbenzene was polymerized in admixture with 1 part of 1,1,2,2-tetrabromoethane, 0.43 part of benzoyl peroxide and 0.2 part of dicumyl peroxide in an aqueous suspension employing procedure similar to that employed in Example 1, except that the polymerization was carried out at a temperature of 90° C. for a period of 25 hours. The product was obtained as solid granules of the polymer in the form of rounded beads of about 1 millimeter diameter. A portion of the product was fed to a plastics extruder wherein it was melted, then extruded through an outlet in the form of a continuous strand having a diameter of 1/8 inch. The strand was cooled. When ignited in a flame then removed from the flame, the strand was self-extinguishing.

EXAMPLE 11

A charge of 100 parts by weight of styrene and 0.045 part of divinylbenzene was polymerized in admixture with 0.5 part of 1,2-dibromo-1,1,2,2-tetrachloroethane, 0.3 part of benzoyl peroxide and 0.2 part of dicumyl peroxide in an aqueous suspension employing procedure similar to that employed in Example 10. The product was in the form of discrete solid particles. It was heat-plastified and extruded as a continuous strand of 1/8-inch diameter, then cooled. The extruded product was self-extinguishing when ignited in a flame and then removed from the flame.

EXAMPLE 12

In each of a series of experiments, a foamable polymer composition was prepared by polymerizing 100 parts by weight of styrene with 0.4 percent by weight of benzoyl peroxide in an aqueous suspension in admixture with 7.67 percent of n-pentane as foaming agent, and 0.5 percent of 1,2-dibromo-1,1,2,2-tetrachloroethane and a peroxy ester in kind and amount as stated in the following table, each based on the weight of the monomeric styrene initially used, as combined synergist flame-proofing agent. The ingredients were placed in a closed pressure resistant vessel, together with an aqueous solution consisting of 139 parts by weight of water containing 0.3 percent by weight of polyvinyltoluene sulfonic acid, ammonium salt, 1 percent of ammonium sulfate, 0.1 percent of potassium dichromate. The resulting mixture was agitated and heated at a temperature of 75° C. for a period of 48 hours, then was heated and agitated at 90° C. for 5 hours to complete the polymerization and produce a solid product in granular or bead form. The product was recovered by cooling the mixture to room temperature in the vessel in which it was prepared, then removing the mixture and separating the polymeric product by filtering it from the aqueous liquid. The product was washed with water and dried.

A portion of the granular product was placed in an open chamber and heated with steam at a temperature of 195° F. The granules were pre-foamed to a density of 2 pounds per cubic foot. A portion of the pre-foamed beads were placed in a perforated mold and were further foamed in the mold to form a molded article. Test pieces, free of outer or continuous surface, of 1/4 x 1 inch cross-section by 6 inches long were cut from the foamed article. These test pieces were used to determine the burning or self-extinguishing property of the foam. The procedure for carrying out the test was to hold a test piece of the foam by one end in a fixed horizontal position with the one inch side perpendicular, then move a microburner with a one inch flame under the test piece so that the tip of the flame contacts the lower edge of the free end of the test piece and ignites the same. The flame is then removed and the test piece is observed for burning. The time in seconds for the flame to be self-extinguishing is recorded. The burning time in seconds reported in the table is the average value for four tests. Table V identifies the experiments, and names the peroxy ester employed and gives the proportion of said ester, based on the weight of the styrene, initially used in combination with the 1,2-dibromo-1,1,2,2-tetrachloroethane as synergist flame-proofing agents for the foamed product. The table also gives the burning time, i.e. the time in seconds for the ignited foam to be self-extinguished.

*Table V*

| Run No. | Self-Extinguishing Agents | | | Foamed Product |
|---|---|---|---|---|
| | 1,2-Dibromo-1,1,2,2-Tetrachloroethane, Percent | Peroxy Ester | | Burning Time, Sec. |
| | | Kind | Percent | |
| 1 | 0.5 | t. Butylperacetate | 0.2 | 3.2 |
| 2 | 0.5 | do | 0.5 | 2.3 |
| 3 | 0.5 | do | 1.0 | 1.5 |
| 4 | 0.5 | t.-Butylperbenzoate | 0.2 | 2.5 |
| 5 | 0.5 | do | 0.5 | 2.3 |
| 6 | 0.5 | do | 1.0 | 1.0 |

In contrast to the short burning time or the rapid self-extinguishing of the foamed product containing the combination of the synergistic self-extinguishing agents, i.e. containing both the 1,2-dibromo-1,1,2,2-tetrachloroethane and the peroxy ester, a composition prepared in similar manner, except omitting the peroxy ester, when foamed and tested was found to burn until the test piece was consumed.

EXAMPLE 13

In each of a series of experiments, a foamable polymer composition was prepared by polymerizing 100 parts by weight of a mixture of monomers, consisting of 99.88 percent by weight of styrene, 0.04 percent of ethylvinylbenzene and 0.08 percent of divinylbenzene with 0.4 percent by weight of benzoyl peroxide as polymerization catalyst, while in an aqueous suspension in admixture with, based on the weight of the monomers, of 7.67 percent of n-pentane, 0.5 percent of 1,2-dibromo-1,1,2,2-tetrachloroethane and a peroxide as flame-proofing synergist in kind and amount as stated in the following table. The ingredients were placed in a pressure resistant vessel, together with an aqueous solution consisting of 139 parts by weight of water containing from 0.35 to 0.40 percent by weight of polyvinyltoluene sulfonic acid, ammonium salt, from 1.17 to 1.34 percent of ammonium sulfate and 0.1 percent of potassium dichromate. The resulting mixture was agitated and heated in the closed vessel under the autogenous pressure of the mixture of the materials at 90° C. for a period of 11 hours, then was heated at 103° C. for 5 hours to complete the polymerization. The mixture was cooled to room temperature, after which the product was removed, washed with water and dried. Portions of the granular product were pre-foamed, then further foamed in a mold to produce molded cellular articles. Test pieces of the molded articles were prepared and tested for burning time or self-extinguishing properties, employing procedure similar to that employed in Example 12. Table VI identifies the experiments, names the peroxide employed as synergist in combination with the 1,2-dibromo-1,1,2,2-tetrachloroethane flame-proofing agent and gives a burning time in seconds determined for the foamed product. The burning time reported in the table is the average value of four tests.

Table VI

| Run No. | Self-Extinguishing Agents | | | Foamed Product |
|---|---|---|---|---|
| | 1,2-Dibromo-1,1,2,2-Tetrachloroethane, Percent | Peroxide | | Burning Time, Seconds |
| | | Kind | Percent | |
| 1 | 0.5 | Di-tert.-Butyl peroxide | 0.2 | 2.0 |
| 2 | 0.5 | ------do------ | 0.3 | 3.0 |
| 3 | 0.5 | ------do------ | 0.5 | 2.4 |
| 4 | 0.5 | ------do------ | 0.7 | 1.8 |
| 5 | 0.5 | ------do------ | 1.0 | 1.2 |
| 6 | 0.5 | Cumene hydroperoxide | 0.2 | 5.2 |
| 7 | 0.5 | ------do------ | 0.3 | 3.5 |
| 8 | 0.5 | ------do------ | 0.5 | 2.5 |
| 9 | 0.5 | ------do------ | 0.7 | 1.3 |
| 10 | 0.5 | Pinane Hydroperoxide | 0.2 | 13.2 |
| 11 | 0.5 | ------do------ | 0.3 | 4.8 |
| 12 | 0.5 | ------do------ | 0.5 | 3.0 |
| 13 | 0.5 | ------do------ | 0.7 | 3.0 |
| 14 | 0.5 | p-Menthane hydroperoxide | 0.2 | 5.8 |
| 15 | 0.5 | ------do------ | 0.3 | 4.8 |
| 16 | 0.5 | ------do------ | 0.5 | 1.8 |
| 17 | 0.5 | ------do------ | 0.7 | 1.5 |
| 18 | 0.5 | Methyl ethyl ketone peroxide | 1.0 | 7.3 |
| 19 | 0.5 | tert.-Butyl hydroperoxide | 0.05 | 7.5 |
| 20 | 0.5 | ------do------ | 0.2 | 5.5 |
| 21 | 0.5 | ------do------ | 1.0 | 1.5 |

We claim:
1. A method for making a fire and flame retardant polymer composition which comprises polymerizing the monomer portion of a liquid mixture comprising (1) at least one polymerizable monomer consisting of at least 70 percent by weight of a vinyl aromatic compound selected from the group consisting of (a) monovinyl aromatic hydrocarbons of the benzene series, (b) nuclear halogenated monovinyl aromatic hydrocarbons of the benzene series and (c) mixtures of from 99.5 to 99.99 percent by weight of at least one of the monomers (a) and (b) and from 0.01 to 0.5 percent by weight of a divinyl aromatic hydrocarbon of the benzene series, and not more than 30 percent by weight of another monoethylenically unsaturated vinylidene monomer, (2) from 0.2 to 3 percent by weight, based on the weight of the polymer in the final product of an organic bromide having a plurality of bromine atoms attached to carbon atoms of a radical selected from the group consisting of the cyclohexyl and aliphatic radicals, these bromine atoms constituting at least 45 percent by weight of the organic bromide, said amount of the organic bromide being less than is required alone to render the resulting polymer non-flammable, and (3) from 0.1 to 2 percent by weight, based on the weight of the polymer in the final product, of an organic peroxide having a half-life of at least 2 hours as determined in benzene at 100° C., which organic peroxide is a member of the group consisting of methyl ethyl ketone peroxide, 2,5-dimethylhexane-2,5-dihydroperoxide, pinane hydroperoxide, p-menthane hydroperoxide and organic peroxygen compounds having the general formula:

$$R[O\!-\!O\!-\!R']_n$$

wherein R represents a member of the group consisting of (a) monovalent radicals of the class consisting of the acetyl radical, the benzoyl radical, alkyl radicals containing from 2 to 9 carbon atoms and aralkyl radicals of the formula:

wherein $R_1$ represents an aryl hydrocarbon radical of the benzene series and $R_2$ and $R_3$ each represents a member of the group consisting of hydrogen and alkyl radicals containing from 1 to 3 carbon atoms, and (b) divalent radicals of the formula:

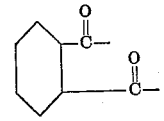

and

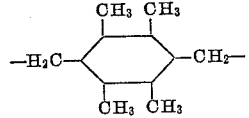

R' represents a member of the group consisting of hydrogen, alkyl radicals containing from 2 to 9 carbon atoms and aralkyl radicals of the formula:

wherein $R_1$, $R_2$ and $R_3$ have the meaning given above, and n is a whole number from 1 to 2, the value of n being 1 when R is a monovalent radical and n being 2 when R is a divalent radical, by heating said liquid mixture at temperatures between 65° and 130° C. such that the polymerization product is a solid body containing the organic bromide and the organic peroxide dispersed throughout.

2. A method according to claim 1, wherein the liquid mixture contains from 0.05 to 0.4 gram molecular proportion of a volatile organic compound selected from the group consisting of saturated aliphatic hydrocarbons containing from 4 to 7 carbon atoms in the molecule and perchlorofluorocarbons, per 100 grams of the sum of the polymerizable monomer and the polymer initially used, said volatile organic compound having a molecular weight of at least 58 and boiling at a temperature below 95° C. at 760 millimeters absolute pressure.

3. A method according to claim 2, wherein the polymerization is carried out while having the liquid mixture of polymerizable monomer and the ingredients soluble therein dispersed in a liquid aqueous medium.

4. A method according to claim 3, wherein the polymerizable monomer consists of at least one monovinyl aromatic hydrocarbon of the benzene series.

5. A method according to claim 3, wherein the polymerizable monomer consists of a mixture of from 99.5 to 99.99 percent by weight of a monovinyl aromatic hydrocarbon of the benzene series and from 0.01 to 0.5 percent of divinylbenzene.

6. A method according to claim 5, wherein the monovinyl aromatic hydrocarbon is styrene.

7. A self-extinguishing thermoplastic composition consisting essentially of a normally solid thermoplastic polymer of at least 70 percent by weight of a vinyl aromatic compound selected from the group consisting of (a) monovinyl aromatic hydrocarbons of the benzene series, (b) nuclear halogenated monovinyl aromatic hydrocarbons of the benzene series and (c) mixtures of from 99.5 to 99.99 percent by weight of at least one of the monomers (a) and (b) and from 0.01 to 0.5 percent by weight of a divinyl aromatic hydrocarbon of the benzene series, not more than 30 percent by weight of another monoethylenically unsaturated vinylidene monomer, having dispersed throughout from 0.2 to 3 percent by weight, based on the weight of the polymer, of an organic bromide having a plurality of bromine atoms attached to carbon atoms of a radical selected from the group consisting of the cyclohexyl radicals and aliphatic radicals, these bromine atoms constituting at least 45 percent by weight of the organic bromide, said amount of the organic bromide being less than is required alone to render the resulting polymer non-flammable, and from 0.1 to 2 percent by weight, based on the weight of the polymer, of an organic peroxide having a half-life of at least 2 hours as determined in benzene at 100° C., which organic peroxide is a member of the group consisting of methyl ethyl ketone, 2,5-dimethylhexane-2,5 - dihydroperoxide, pinane hydroperoxide, p-menthane hydroperoxide and organic peroxygen compounds having the general formula:

$$R[O—O—R']_n$$

wherein R represents a member of the group consisting of (a) monovalent radicals of the class consisting of the acetyl radical, the benzoyl radical, alkyl radicals containing from 2 to 9 carbon atoms and aralkyl radicals of the formula:

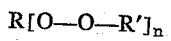

wherein $R_1$ represents an aryl hydrocarbon radical of the benzene series and $R_2$ and $R_3$ each represents a member of the group consisting of hydrogen and alkyl radicals containing from 1 to 3 carbon atoms, and (b) divalent radicals of the formula:

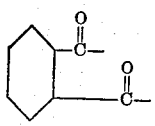

and

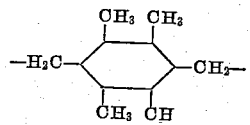

R' represents a member of the group consisting of hydrogen, alkyl radicals containing from 2 to 9 carbon atoms and aralkyl radicals of the formula:

wherein $R_1$, $R_2$ and $R_3$ have the meaning given above, and $n$ is a whole number from 1 to 2, the value of $n$ being 1 when R is a monovalent radical and $n$ being 2 when R is a divalent radical.

8. A normally solid thermoplastic polymer composition capable of being foamed to form a self-extinguishing cellular body which comprises a solid polymer containing in chemically combined form at least 70 percent by weight of a vinyl aromatic compound selected from the group consisting of (a) monovinyl aromatic hydrocarbons of the benzene series, (b) nuclear halogenated monovinyl aromatic hydrocarbons of the benzene series, and (c) mixtures of from 99.5 to 99.99 percent by weight of a monovinyl aromatic hydrocarbon of the benzene series and from 0.5 to 0.01 percent of a divinyl aromatic hydrocarbon of the benzene series, and not more than 30 percent by weight of another monoethylenically unsaturated vinylidene monomer, having dispersed throughout from 0.2 to 3 percent by weight, based on the weight of the polymer, of an organic bromide having a plurality of bromine atoms attached to carbon atoms of a radical selected from the group consisting of the cyclohexyl radical and aliphatic radicals, these bromine atoms constituting at least 45 percent by weight of the organic bromide, said organic bromide being present in an amount less than is required alone to render the polymer non-flammable, from 0.1 to 2 percent by weight, based on the weight of the polymer, of an organic peroxide having a half-life of at least 2 hours as determined in benzene at 100° C., which organic peroxide is a member of the group consisting of methyl ethyl ketone peroxide, 2,5-dimethyl-hexane-2,5-dihydroperoxide, pinane hydroperoxide, p-menthane hydroperoxide, and organic peroxygen compounds having the general formula:

$$R[O—O—R']_n$$

wherein R represents a member of the group consisting of (a) monovalent radicals of the class consisting of the acetyl radical, the benzoyl radical, alkyl radicals containing from 2 to 9 carbon atoms and aralkyl radicals of the formula:

wherein $R_1$ represents an aryl hydrocarbon radical of the benzene series and $R_2$ and $R_3$ each represents a member of the group consisting of hydrogen and alkyl radicals containing from 1 to 3 carbon atoms, and (b) divalent radicals of the formula:

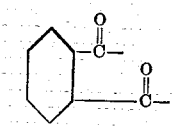

and

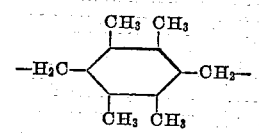

R' represents a member of the group consisting of hydrogen, alkyl radicals containing from 2 to 9 carbon atoms and aralkyl radicals of the formula:

wherein $R_1$, $R_2$ and $R_3$ have the meaning given above, and $n$ is a whole number from 1 to 2, the value of $n$ being 1 when R is a monovalent radical and $n$ being 2 when R is a divalent radical, and from 0.05 to 0.4 gram molecular proportion of a volatile organic compound selected from the group consisting of saturated aliphatic hydrocarbons containing from 4 to 7 carbon atoms in the molecule and perchlorofluorocarbons, per 100 grams of the polymer, said volatile organic compound having a molecular weight of at least 58 and boiling at a temperature below 95° C. at 760 millimeters absolute pressure.

9. A polymer composition as claimed in claim 8, wherein the polymer is polystyrene.

10. A polymer composition as claimed in claim 8, wherein the polymer is a copolymer of from 99.5 to 99.99 percent by weight of a monovinyl aromatic hydrocarbon of the benzene series and from 0.5 to 0.01 percent of divinylbenzene.

11. A polymer composition as claimed in claim 8, wherein the polymer is polystyrene, the organic bromide is 1,2-dibromo-1,1,2,2-tetrachloroethane and the peroxide is dicumyl peroxide.

12. A polymer composition as claimed in claim 8, wherein the polymer is polystyrene, the organic bromide is 1,2-dibromo-1,1,2,2-tetrachloroethane and the organic peroxide is tert.-butyl perbenzoate.

13. A polymer composition as claimed in claim 8, wherein the polymer is a copolymer of from 99.5 to 99.99 percent by weight of a monovinyl aromatic hydrocarbon of the benzene series and from 0.5 to 0.01 percent of divinylbenzene, the organic bromide is 1,2-dibromo-1,1,2,2-tetrachloroethane and the organic peroxide is cumene hydroperoxide.

14. A polymer composition as claimed in claim 8, wherein the polymer is a copolymer of from 99.5 to 99.99 percent by weight of a monovinyl aromatic hydrocarbon of the benzene series and from 0.5 to 0.01 percent of divinylbenzene, the organic bromide is 1,2-dibromo-1,1,2,2-tetrachloroethane and the organic peroxide is p-menthane hydroperoxide.

15. A polymer composition as claimed in claim 8, wherein the polymer is a copolymer of from 99.5 to 99.99 percent by weight of a monovinyl aromatic hydrocarbon of the benzene series and from 0.5 to 0.01 percent of divinylbenzene, the organic bromide is 1,2-dibromo-1,1,2,2-tetrachloroethane and the organic peroxide is tert.-butyl hydroperoxide.

16. A polymer composition as claimed in claim 8, wherein the polymer is a copolymer of from 99.5 to 99.99 percent by weight of a monovinyl aromatic hydrocarbon of the benzene series and from 0.5 to 0.01 percent of divinylbenzene, the organic bromide is 1,2-dibromo-1,1,2,2-tetrachloroethane and the organic peroxide is di-tert.-butyl peroxide.

17. A polymer composition as claimed in claim 8, wherein the polymer is a copolymer of from 99.5 to 99.99 percent by weight of a monovinyl aromatic hydrocarbon of the benzene series and from 0.5 to 0.01 percent of divinylbenzene, the organic bromide is 1,2-dibromo-1,1,2,2-tetrachloroethane and the organic peroxide is methyl ethyl ketone peroxide.

18. A polymer composition as claimed in claim 8, wherein the polymer is a copolymer of from 99.5 to 99.99 percent by weight of a monovinyl aromatic hydrocarbon of the benzene series and from 0.5 to 0.01 percent of divinylbenzene, the organic bromide is 1,1,2,2-tetrabromoethane and the organic peroxide is dicumyl peroxide.

19. A polymer composition as claimed in claim 8, wherein the polymer is a copolymer of from 99.5 to 99.99 percent by weight of a monovinyl aromatic hydrocarbon of the benzene series and from 0.5 to 0.01 percent of divinylbenzene, the organic bromide is pentabromomonochlorocyclohexane and the organic peroxide is dicumyl peroxide.

20. A polymer composition as claimed in claim 8, wherein the polymer is a copolymer of from 99.5 to 99.99 percent by weight of a monovinyl aromatic hydrocarbon of the benzene series and from 0.5 to 0.01 percent of divinylbenzene, the organic bromide is tris-(dibromopropyl)phosphate and the organic peroxide is dicumyl peroxide.

21. In a method for making a fire and flame retardant polymer composition wherein an organic bromide is intimately incorporated with a flammable vinyl aromatic polymer by polymerizing the monomer portion of a liquid mixture comprising (1) at least one polymerizable monomer consisting of at least 70 percent by weight of a vinyl aromatic compound selected from the group consisting of (a) monovinyl aromatic hydrocarbons of the benzene series, (b) nuclear halogenated monovinyl aromatic hydrocarbons of the benzene series and (c) mixtures of from 99.5 to 99.99 percent by weight of at least one of the monomers (a) and (b) and from 0.01 to 0.5 percent of a divinyl aromatic hydrocarbon of the benzene series, and not more than 30 percent by weight of another monoethylenically unsaturated vinylidene monomer, (2) from 0.2 to 3 percent by weight, based on the weight of the polymer in the final product, of an organic bromide having a plurality of bromine atoms attached to carbon atoms of a radical selected from the group consisting of the cyclohexyl and aliphatic radicals, these bromine atoms constituting at least 45 percent by weight of the organic bromide, the improvement which consists in incorporating in the liquid mixture from 0.1 to 2 percent by weight, based on the weight of the polymer in the final product, of an organic peroxide having a half-life of at least 2 hours as determined in benzene at 100° C. and thereafter polymerizing the monomer at temperatures between 65° and 130° C. such that the polymerization product is a solid body containing the organic bromide and the organic peroxide dispersed throughout.

22. A normally solid thermoplastic polymer composition capable of being foamed to form a self-extinguishing cellular body which comprises a solid polymer containing in chemically combined form at least 70 percent by weight of a vinyl aromatic compound selected from the group consisting of (a) monovinyl aromatic hydrocarbons of the benzene series, (b) nuclear halogenated monovinyl aromatic hydrocarbons of the benzene series, and (c) mixtures of from 99.5 to 99.99 percent by weight of a monovinyl aromatic hydrocarbon of the benzene series and from 0.5 to 0.01 percent of a divinyl aromatic hydrocarbon of the benzene series, and not more than 30 percent by weight of another monoethylenically unsaturated vinylidene monomer, from 0.2 to 3 percent by weight of an organic bromide having a plurality of bromine atoms attached to carbon atoms of a radical selected from the group consisting of the cyclohexyl radical and aliphatic radicals, these bromine atoms constituting at least 45 percent by weight of the organic bromide, said organic bromide being present in an amount less than is required alone to render the polymer non-flammable, from 0.1 to 2 percent of an organic peroxide having a half-life of at least 2 hours as determined in benzene at 100° C., and from 0.05 to 0.4 gram molecular proportion of a volatile organic compound selected from the group consisting of saturated aliphatic hydrocarbons containing from 4 to 7 carbon atoms in the molecule and perchlorofluorocarbons, per 100 grams of the polymer, said volatile organic compound having a molecular weight of at least 58 and boiling at a temperature below 95° C. at 760 millimeters absolute pressure.

23. A self-extinguishing cellular thermoplastic vinyl aromatic polymer article comprising a foamed normally solid thermoplastic polymer of at least 70 percent by weight of a vinyl aromatic compound selected from the group consisting of (a) monovinyl aromatic hydrocarbons of the benzene series, (b) nuclear halogenated monovinyl aromatic compounds of the benzene series, and (c) mixtures of from 99.5 to 99.99 percent by weight of at least one of the monomers (a) and (b) and from 0.5 to 0.01 percent by weight of a divinyl aromatic hydrocarbon of the benzene series, and not more than 30 percent by weight of another monoethylenically unsaturated vinylidene monomer, having intimately incorporated therewith from 0.2 to 3 percent by weight of an organic bromide having a plurality of bromine atoms attached to carbon atoms of a radical selected from the group consisting of the cyclohexyl radical and aliphatic radicals, these bromine atoms constituting at least 45 percent by weight of the organic bromide, said organic bromide being present in amount less than is required alone to render the polymer nonflammable, and from 0.1 to 2 percent by weight of an organic peroxide having a half-life of at least 2 hours as determined in benzene at 100° C.

24. A self-extinguishing cellular thermoplastic vinyl aromatic polymer article comprising foamed normally solid polystyrene having intimately incorporated therewith from 0.2 to 3 percent by weight of pentabromomonochlorocyclohexane and from 0.1 to 2 percent by weight of dicumyl peroxide.

25. A self-extinguishing cellular thermoplastic vinyl aromatic polymer article comprising a foamed normally solid copolymer of from 99.5 to 99.99 percent by weight of a monovinyl aromatic hydrocarbon of the benzene series and from 0.5 to 0.01 percent of divinylbenzene having intimately incorporated therewith from 0.2 to 3 percent by weight of 1,2-dibromo-1,1,2,2-tetrachloroethane and from 0.1 to 2 percent by weight of dicumyl peroxide.

References Cited in the file of this patent

UNITED STATES PATENTS

| | | |
|---|---|---|
| 2,489,226 | Morris et al. | Nov. 22, 1949 |
| 2,676,946 | McCurdy et al. | Apr. 27, 1954 |
| 2,681,321 | Stastny et al. | June 15, 1954 |
| 2,909,501 | Robitschek et al. | Oct. 20, 1959 |

OTHER REFERENCES

Walling: "Free Radicals in Solution," published 1957, by Wiley and Sons, pages 61, 62, 472 and 473.